United States Patent
Naik et al.

(10) Patent No.: US 9,612,829 B2
(45) Date of Patent: Apr. 4, 2017

(54) SYSTEM AND METHOD FOR PATTERN BASED SERVICES EXTRACTION

(75) Inventors: Ravindra Naik, Mumbai (IN); Amit Saxena, Mumbai (IN)

(73) Assignee: Tata Consultancy Services, Mumbai (IN)

( * ) Notice: Subject to any disclaimer, the term of this patent is extended or adjusted under 35 U.S.C. 154(b) by 1200 days.

(21) Appl. No.: 12/298,527

(22) Filed: Oct. 25, 2008

(65) Prior Publication Data

US 2011/0138350 A1 Jun. 9, 2011

Related U.S. Application Data

(63) Continuation of application No. PCT/IN2007/000169, filed on Apr. 26, 2007.

(30) Foreign Application Priority Data

Apr. 26, 2006 (IN) ............................ 654/MUM/2006

(51) Int. Cl.
*G06F 9/44* (2006.01)
*G06F 11/34* (2006.01)

(52) U.S. Cl.
CPC ............ *G06F 8/74* (2013.01); *G06F 11/3466* (2013.01)

(58) Field of Classification Search
None
See application file for complete search history.

(56) References Cited

U.S. PATENT DOCUMENTS

| | | | |
|---|---|---|---|
| 6,122,622 A * | 9/2000 | Wiitala et al. | 705/28 |
| 6,389,385 B1 * | 5/2002 | King | 703/27 |
| 6,697,088 B1 * | 2/2004 | Hollander | 715/744 |
| 7,171,655 B2 * | 1/2007 | Gordon et al. | 717/146 |
| 8,090,744 B1 * | 1/2012 | Baird | 707/791 |
| 2002/0056012 A1 * | 5/2002 | Abileah et al. | 709/310 |
| 2002/0099790 A1 * | 7/2002 | Mosher | H04H 20/71 709/217 |
| 2003/0014510 A1 * | 1/2003 | Avvari et al. | 709/223 |
| 2003/0033162 A1 * | 2/2003 | Houssiaux et al. | 705/1 |
| 2003/0051186 A1 * | 3/2003 | Boudnik et al. | 714/2 |
| 2003/0056192 A1 * | 3/2003 | Burgess | 717/100 |
| 2003/0097485 A1 * | 5/2003 | Horvitz et al. | 709/313 |
| 2003/0221170 A1 * | 11/2003 | Yagi | G06F 17/212 715/251 |
| 2004/0064788 A1 * | 4/2004 | Gownder et al. | 715/513 |
| 2004/0088653 A1 * | 5/2004 | Bell et al. | 715/523 |
| 2004/0133635 A1 * | 7/2004 | Spriestersbach | G06F 17/30905 709/203 |
| 2004/0136698 A1 * | 7/2004 | Mock | G11B 27/105 386/232 |
| 2004/0255048 A1 * | 12/2004 | Lev Ran et al. | 709/249 |

(Continued)

OTHER PUBLICATIONS

"Service" definition. Electronically accessed on Oct. 31, 2012. URL: http://foldoc.org/service.*

(Continued)

*Primary Examiner* — Henry Tsai
*Assistant Examiner* — Christopher Bartels
(74) *Attorney, Agent, or Firm* — Akerman LLP; Mammen (Roy) P. Zachariah, Jr.

(57) ABSTRACT

The present invention relates to a method and system comprising service pattern definitions and automated extraction of Services from the legacy code based on the pattern matching.

6 Claims, 3 Drawing Sheets

(56) References Cited

U.S. PATENT DOCUMENTS

| | | | |
|---|---|---|---|
| 2005/0028143 A1* | 2/2005 | Aridor et al. | 717/122 |
| 2005/0060317 A1* | 3/2005 | Lott | G06Q 10/00 |
| 2005/0066313 A1* | 3/2005 | Bates | G06F 11/3648 |
| | | | 717/129 |
| 2005/0125387 A1* | 6/2005 | Fish | G06F 17/30997 |
| 2005/0183066 A1* | 8/2005 | Jabori | G06F 11/3636 |
| | | | 717/124 |
| 2005/0198628 A1* | 9/2005 | Graham | G06F 8/64 |
| | | | 717/174 |
| 2005/0210227 A1* | 9/2005 | Emerson et al. | 713/1 |
| 2005/0216555 A1* | 9/2005 | English | G06Q 50/18 |
| | | | 709/204 |
| 2005/0289527 A1* | 12/2005 | Illowsky | G06F 1/3203 |
| | | | 717/148 |
| 2006/0106473 A1* | 5/2006 | Enright | G06Q 10/06 |
| | | | 700/96 |
| 2006/0112175 A1* | 5/2006 | Sellers et al. | 709/223 |
| 2007/0168909 A1* | 7/2007 | Vaidyanathan et al. | 717/100 |
| 2007/0226320 A1* | 9/2007 | Hager et al. | 709/219 |
| 2007/0255751 A1* | 11/2007 | Bansal et al. | 707/103 R |
| 2008/0148225 A1* | 6/2008 | Sarkar et al. | 717/107 |
| 2009/0282301 A1* | 11/2009 | Flynn et al. | 714/710 |
| 2010/0083221 A1* | 4/2010 | Naik et al. | 717/108 |
| 2011/0113070 A1* | 5/2011 | McCurdy et al. | 707/802 |
| 2012/0072583 A1* | 3/2012 | Kupferman | G06F 11/3495 |
| | | | 709/224 |

OTHER PUBLICATIONS

"XML Toolkit for iSeries", Publisher: IBM; Version 5 Release 2; 26 pages; Publication Date: Jul. 19, 2010.*

* cited by examiner

SYSTEM AND METHOD FOR PATTERN BASED SERVICES EXTRACTION

FIELD OF THE INVENTION

The present invention relates to a system and method for pattern based service extraction from legacy applications.

More particularly, the present invention relates to a method and system comprising service pattern definitions and automated extraction of Services from the legacy code based on the pattern matching.

PRIOR ART

References

U.S. Pat. No. 6,687,873
U.S. Pat. No. 6,847,981
EP1221090

In U.S. Pat. No. 6,687,873 a method and system for modifying program applications of a legacy computer system to directly output data in XML format models the legacy computer system, maps the model to an XML schema and automatically modifies one or more applications to directly output XML formatted data in cooperation with a writer engine and a context table. A modeling engine lists the incidents within the applications that write data and generates a report data model. The report data model includes statically determined value or type of the data fields and is written in a formal grammar that describes how the write operations are combined. A modification specification is created to define modifications to the legacy computer system applications that relate applications that write data to the XML schema. A code generation engine then applies the modification specification to the applications to write modified applications that, in cooperation with a writer engine and context table, directly output XML formatted data from the legacy computer system without a need for transforming the data.

reverse engineering module for analyzing the existing servlet program source, a visualizer for visualizing the analyzed information, a business logic extractor for extracting a reusable business logic, and an EJB component generator for generating the EJB components using the extracted information. The servlet code analyzer considers the flexibility of coding permitted by the servlet program and the use of a multi-language and the visualizer helps the understanding of the existing legacy program. The business logic extractor extracts the reusable module by extracting the business logic within many user interface related codes, and thus enable the reuse of software. The EJB component generator generates java codes in a jar file that can be deployed.

In EP1221090, the concept of a service is introduced. A service denotes collaboration between different software artifacts of the software architecture at varying levels of abstractions. This service concept provides the ability to trace identified services from one abstraction level to another within the software system, which supports the mapping of features to code and vice versa. According to a preferred embodiment, the method for describing software architecture comprises steps such as determining interfaces between software artifacts that make up the software architecture and structuring the determined interfaces into basic dialogues. The dialogues are recorded or written in formal definitions of each, and the purpose and usage of dialogues and interactions as services are documented. Each logical service is then mapped to each physical service used in its implementation, and a determination is made as to whether the mapping is simple enough. When the mapping is simple enough, it is formally documented. Prior to the documentation of purpose and usage of the dialogues, a determination is made as to the interactions between applications within the system.

BACKGROUND OF THE INVENTION

The advancement in technologies is demanding a need for easy and effective development and maintenance of software applications. Easy integration options for software applications are a must for today's distributed & collaborative environment. Legacy applications can also be re-architected to take benefits from the state of the art practices if they can be re-factored with ease.

In Legacy systems functionalities or activities are complex and inter twined. The present invention aims at re architecting them by segregating activities/functionalities into services.

Legacy systems/applications are software applications that have been written some time ago and which do not conform or are not extensible to new or modern software platforms or modern software architectures. For example, a legacy system or application is any system or application implemented and used by a company for a number of years and which became an integral part of running the business. More specifically, it is a system, which persists in use over a large turnover of managers of the system. Such systems or applications run fine, but each new manager has less knowledge of the system or application as time progresses. Examples of such, legacy systems include mainframe applications written in Cobol, AS/400 applications written in RPG etc. Such applications typically contain a great deal of business knowledge. It is often desirable to extract the business knowledge for implementation into a new application on more modern platforms. It is important to note that even software systems programmed for modern platforms may be legacy if they employ legacy design and architecting principles.

It is the object of the invention to modularize the legacy applications into smaller units for better understanding of the business logic contained within the application for various purposes including but not limited to easier maintenance.

It is yet another object of the invention to move legacy applications from monolithic architecture to modern service oriented architecture.

It is yet another object of the invention to migrate legacy applications irrespective of the platforms.

It is the object of the present invention to formulate various service patterns.

Legacy applications typically follow conversational and/or pseudo conversational style of programming containing code that implements presentation layer logic and the business logic in the same program. These programs deal with multiple aspects of the architecture and pose challenges in maintenance such as identifying a problem or adding new feature, as this would be more expensive and a time consuming exercise. These challenges are equally applicable to batch-oriented legacy programs.

It eliminates the task of manual functioning thus facilitating simplicity and saves time. It is a very cost effective measure.

These and other objects, features and advantages will be readily apparent upon consideration of the following detailed description in conjunction with the accompanying drawings.

SUMMARY OF THE INVENTION

The invention is directed to a method and system of defining patterns for identifying services, and extracting services in an automated way from legacy applications. The extracted services are utilized for better understanding of the existing business applications or converting an existing business application, typically a set of legacy programs, to a new and more modern application, on the same or new platforms.

The inventive step involved is a method and system of defining Service patterns based on Service abstraction and to extract Services from the Legacy application based on pattern matching in an automated way. The present invention employs a workbench for generating the pattern matcher given the service patterns.

In the present invention the extracted services form a basis for re-factoring the code utilizing state of the art programming styles, which can either be used for better understanding of the code or the transformation of the code into new language and platform or re-engineer the code in the same language for variety of purpose such as better maintenance, better manageability and increase reusability.

Figure 1:
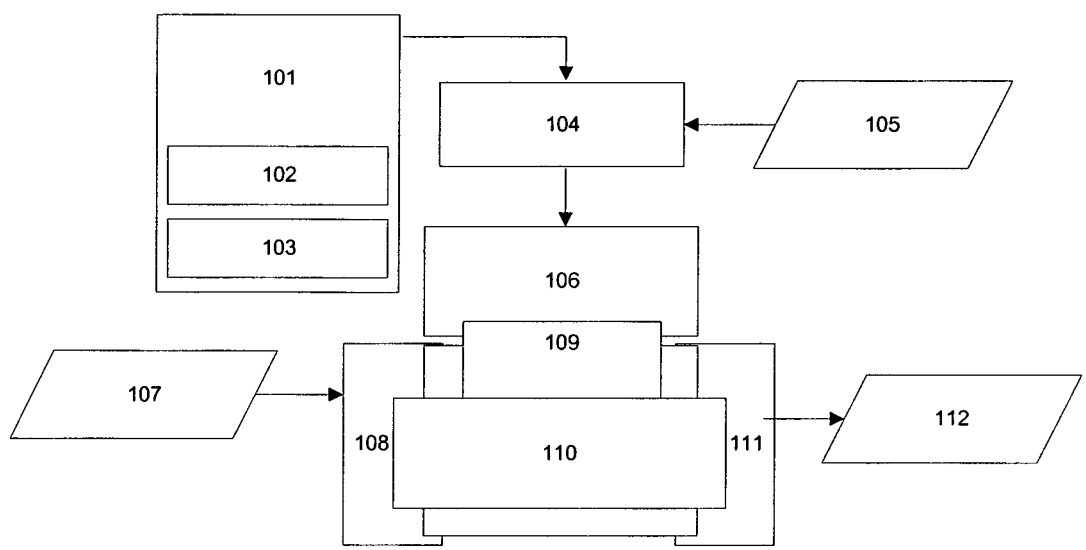
FIG. 1 describes the method and system for service extraction

Using the knowledge and experience of how legacy applications are written, service patterns are defined and stored in a pattern definition repository (101). These patterns can be represented using the structure of the program (Structural Service Pattern (102)) or depending on the functionality governed by specific set of data entities (Functional Service Pattern (103)). These definitions have been arrived at by analyzing variety of legacy applications and abstracting out the logic in a way to be able to see multiple services in action to achieve the intended objective. The notion of repository (101) specifies that multiple patterns can be stored here. The current invention focuses on two distinct set of patterns namely structural service pattern depicted as (102) and functional service pattern depicted as (103). It is to be noted that these patterns are not syntactic patterns, but capture the programming styles embodied in legacy programs, thus can be expressed in terms of methods utilized to match the patterns. These patterns are specified (104), taking into consideration the specific programming language syntax (105) that provide commands for specific actions (example statement may be to perform user interaction), in the format understandable by the workbench (106) to generate the service pattern matcher (110). Statement is a program unit that defines a specific action intended by the programmer.

Legacy applications (107) when passed through the system with language specific parser (108), as the first step, will generate an intermediate representation, on which the pattern matcher (110) that utilizes the analysis information generated by the program analyzer (109) is applied. Based on the definition of the service pattern either or both of pattern matching i.e. structural service pattern (102) and functional service pattern (103) can be matched in the selected program using the service pattern matcher (110). The identified services are marked using the statement marker (111), which can write the legacy code in human readable format with service marking. Marked legacy code (112) with extracted services can be further utilized for various purposes that require application understanding using either manual or automated methods.

The workbench (106) is used to build custom tools to match given patterns in the legacy application. It provides a specification driven approach backed by powerful program search and program analysis engines to generate the pattern matchers.

DETAILED DESCRIPTION OF PRESENT INVENTION

Service Definition:

Service, by definition, is a request fulfilling mechanism that performs pre-specified processing on available inputs and provides the outputs to the requestor. Any business application can be envisaged to have multiple services invoked with pre-defined orchestration to complete a given transaction. This invention presents pattern based service extraction from the legacy application.

Service denotes an atomic unit of domain functionality (in case of a banking domain example services are deposit, withdraw, transfer, etc.), or it can denote a structural but cohesive unit of work (example services are populate screen, process screen, etc.).

Service Pattern Definition

To identify services in legacy software systems, two types of service patterns are defined.

Structural Services Pattern—This pattern is defined based on how program is structured to achieve a business function. The definition involves user interaction statements within a program and the control flow surrounding those statements. This pattern enables to extract the services based on the structural properties of the application.

The program statements where user interaction is accomplished are used to locate the boundaries of the services. A boundary defines start and end of a service. Every statement that directly or indirectly controls the execution of the boundary statement also becomes a boundary. The service includes all the statements between the identified boundaries.

Functional Service Pattern—This pattern uses the preliminary application knowledge to determine data entities that are used to control a particular functionality. This pattern is defined based on how select data entities are taking different values and the statements getting executed for a selected value, wherein each value represents a desired business function.

This pattern makes use of select data entities and the enumerated set of values that these entities can take. The statements whose execution is controlled by the data entities having specific value (among the enumerated set of values) constitute the functionality that is represented by the specific value. Based on the identified statements, the pattern also defines identifying additional data entities and their values to determine additional statements that constitute the service.

These two patterns are specified in terms of unique set of steps in a workbench to generate the services pattern matcher. When a legacy application is passed through this matcher, it performs pattern matching by executing the pattern-matching steps in the defined order for both service patterns.

Method for Structural Service Pattern Matching

Figure 2:
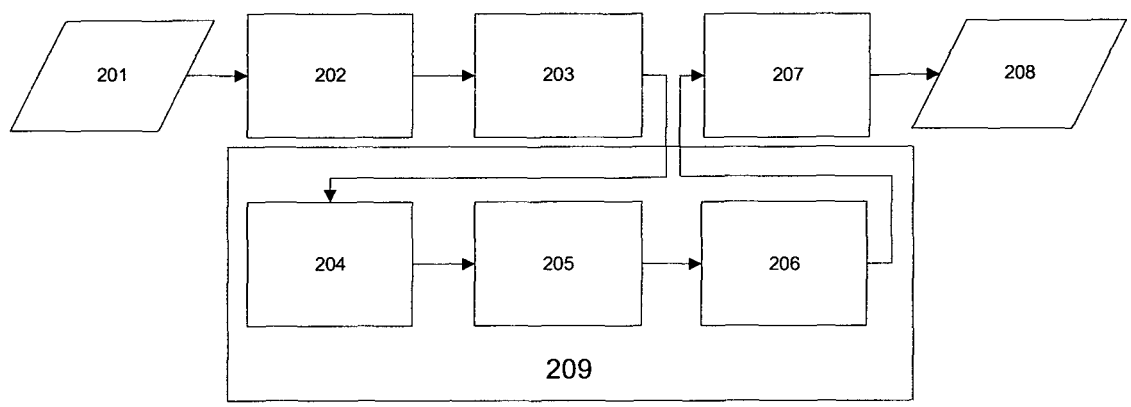
FIG. 2 depicts the method for service extraction using structural service pattern matching.

FIG. 2 depicts the method for service extraction using structural service pattern matching.

In the first step, the selected program (201) is parsed (202) and a common intermediate representation is created for all subsequent tool-based analysis and pattern matching. The entry (main) method to start the program analysis is identified—this serves as the Start block for the pattern matching.

For the application, tool based analysis (203) is performed to build the subroutine-call hierarchy and control-flow graph for each subroutine. The program-level call hierarchy is also built during this step.

All the statements that perform screen input-output (screen interactions) are identified (204). These form the boundaries of the services. All the statements that "control" the execution of such statements are also identified (205). These form the additional boundaries of the services. All the statements within two adjacent boundaries are identified as a service (206). The block denoted as (209) depicts the structural service pattern matching method. All identified services are marked (207) to get the extracted services (208) in human readable format.

Method for Functional Service Pattern Matching

Figure 3:
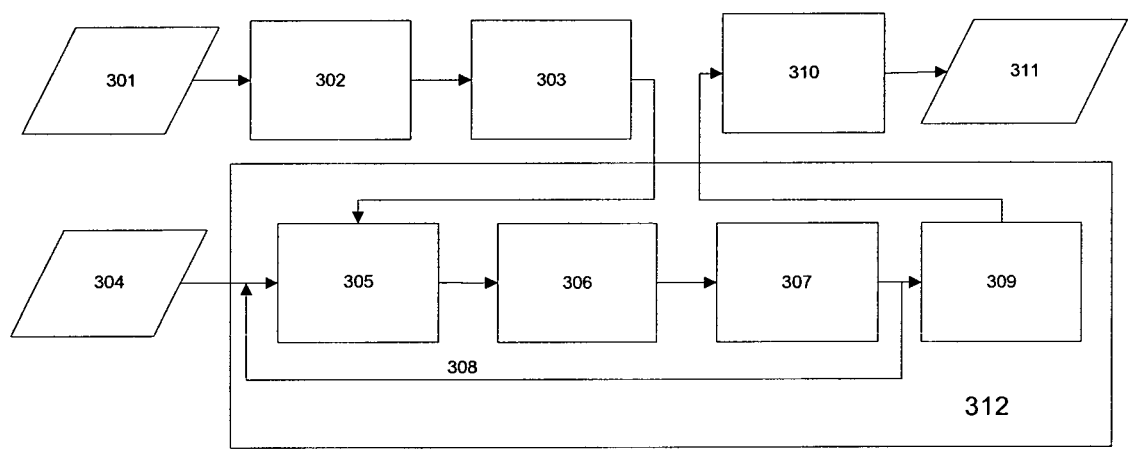
FIG. 3 depicts the method for service extraction using functional service pattern matching.

FIG. 3 depicts the method for service extraction using functional service pattern matching.

In the first step, the program (301) is parsed (302) and a common intermediate representation is created for all subsequent tool-based analysis and pattern matching. The entry (main) method to start the program analysis is identified—this serves as the Start block for the pattern matching. For the application, tool based analysis (303) is performed to build the subroutine-call hierarchy and control-flow graph for each subroutine. For each data-entity, data-flow is identified.

Data entities, which decide the execution of a specific functionality, are identified with the help of available functional knowledge of the selected program (301). Along with the data entities, the enumerated set of values used by these variables to implement the functionalities is collected. The functional service pattern consists of data entities and unique values (304) held by these entities.

In the next step, the conditional statements where the functional data-entities are used, are identified (305). The blocks of statements controlled by these data-entities represent the functionality—the functionality is identified (306) by the values of the data entities. Combination of multiple data-entities may represent single functionality.

Next, the blocks of statements so identified are used to determine additional data-entities and their possible values (307). The additional data-entities and their values are used to identify additional statements that implement the same functionality. This is depicted as iterative step (308). All such statements, possibly in different parts of the applications, are collected together to represent a service (309). The block denoted as (312) depicts the functional service pattern matching method. All identified services are marked (310) to get the extracted services (311) in human readable format.

All above steps are performed for each value of the functional data-entities to identify different services.

Statement of the Invention

According to the present invention therefore a method of pattern based service extraction from legacy application comprises of defining service patterns, specifying the said patterns into a workbench to generate the pattern matcher, using said pattern matcher to identify services and marking the identified services.

The said service patterns consist of structural service pattern based on structural properties and functional service pattern based on functionality implemented. There are at least two service patterns defined and stored in a repository. This repository is updated with the newly defined service patterns.

The structural service pattern consists of identifying user interface statements as service boundaries. All the statements controlling the execution of said service boundaries form the additional service boundaries. The statements in between said service boundaries form a service. The said functional service pattern consists of pre-determined data entities and its values. The said statements controlled by unique values of said data entities form a service. The additional data entities and its values are identified within the said service. The statements controlled by unique values of said additional data entities extend the said service.

The present invention also comprises of a system of automated pattern based service extraction from legacy application employing a language specific parser, an analyzer, a service pattern matcher and service marker in the given order to identify and mark the services. The said service pattern matcher is generated by specifying the service patterns into a workbench. The said service pattern matcher is independent of programming languages Detailed descriptions of the preferred embodiment are provided herein; however, it is to be understood that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or matter.

The embodiments of the invention as described above and the methods disclosed herein will suggest further modification and alternations to those skilled in the art. Such further modifications and alterations may be made without departing from the sprit and scope of the invention, which is defined by the scope of the claims herein.

INDUSTRIAL APPLICATION & ADVANTAGES

1. It is a very effective tool in modern business.
2. It involves establishment of service patterns that can be changed with changing times to suit the application.
3. It saves manpower and cost.
4. It is a very intellectual tool that brings about effective and efficient results.
5. It helps modularize the legacy applications.
6. It helps modernize legacy applications to service-oriented architecture
7. It helps documentation of existing business applications
8. It performs reverse engineering of applications to extract services

We claim:

1. A method of automatically extracting a plurality of services from a software application based on at least one matching pattern, the method comprising:
    defining one or more service patterns each corresponding to a type of service in the software application, wherein the one or more service patterns are a functional service pattern or a structural service pattern, and wherein the software application is a legacy software application, and wherein the legacy software application is built with inter-twined source code jointly corresponding to the plurality of services, and wherein the plurality of services are not distinctly identifiable in the legacy software application;

inputting the one or more service patterns to a workbench to generate a service pattern matcher, wherein the workbench uses a specification driven approach backed by program search and analysis to generate the service pattern matcher, wherein the service pattern matcher corresponds to the one or more service patterns;

parsing the inter-twined source code of the legacy software application using a language specific parser to generate an intermediate representation of the inter-twined source code;

performing tool-based analysis to build a subroutine-call hierarchy and control-flow graph for each subroutine upon parsing the inter-twined source code;

defining initial service boundaries for the plurality of services by identifying interface statements;

identifying control statements from the legacy software application, wherein the control statements control an execution of the initial service boundaries and form additional service boundaries;

identifying the plurality of services from the intermediate representation of the inter-twined source code using the service pattern matcher, wherein the structural service pattern comprises identifying a plurality of user interface statements as the initial service boundaries and the functional service pattern comprises a plurality of pre-determined data entities and values; and marking the identified plurality of services to obtain extracted services in human readable format, wherein the extracted services form a basis for re-factoring the inter-twined source code.

2. The method of claim 1, further comprising generating the service pattern matcher by specifying a plurality of service patterns into a workbench, wherein the service pattern matcher is independent of programming languages.

3. The method of claim 1, wherein defining the functional service pattern comprises:

locating a first set of data entities of the legacy software application, wherein each data entity of the first set of data entities corresponds to a first set of code statements within the service, wherein each data entity comprises a first data field and a corresponding first data value, wherein the first data field and the corresponding first data value represent a particular service of the plurality of services;

determining a second set of data entities, of the legacy software application, based upon the first set of data entities, wherein each data entity of the second set of data entities corresponds to a second set of code statements within the service, wherein each data entity of the second set of data entities comprise a second data field and a corresponding second data value, wherein the second data field and the corresponding second data value represent the particular service of the plurality of services;

determining the first set of code statements based upon the first set of data entities, wherein the first set of code statements perform a step within the service;

determining the second set of code statements based upon the second set of data entities, wherein the second set of code statements perform another step within the service; and defining the functional service pattern based upon the first set of code statements and the second set of code statements.

4. The method of claim 1, wherein the legacy software application is a mainframe application or an Application-System 400 (AS 400) application.

5. A system for automatically extracting a service from a software application based on at least one matching pattern, the system comprising:

a memory storing instructions;

a processor configured to execute the instructions to perform operations, the processor configured to:

define one or more service patterns each corresponding to a type of service of a plurality of services in the software application, wherein the one or more service patterns are a functional service pattern or a structural service pattern, and wherein the software application is a legacy software application, and wherein the legacy software application is built with intertwined source code jointly corresponding to the plurality of services, and wherein the plurality of services are not distinctly identifiable in the legacy software application;

input the one or more service patterns to a workbench to generate a service pattern matcher, wherein the workbench uses a specification driven approach backed by program search and analysis to generate the service pattern matcher, wherein the service pattern matcher corresponds to the one or more service patterns;

parse the inter-twined source code of the legacy software application using a language specific parser to generate an intermediate representation of the inter-twined source code;

perform tool-based analysis to build a subroutine-call hierarchy and control-flow graph for each subroutine upon parsing the inter-twined source code;

define initial service boundaries for the plurality of services by identifying interface statements;

identify control statements from the legacy software application, wherein the control statements control an execution of the initial service boundaries and form additional service boundaries;

identify the plurality of services from the intermediate representation of the inter-twined source code using the service pattern matcher, wherein the structural service pattern comprises identifying a plurality of user interface statements as the initial service boundaries and the functional service pattern comprises a plurality of pre-determined data entities and values; and mark the identified plurality of services to obtain extracted services in human readable format, wherein the extracted services form a basis for re-factoring the inter-twined source code.

6. The system of claim 5 wherein the service pattern matcher is independent of programming languages.

* * * * *